United States Patent
Jiang et al.

(10) Patent No.: US 6,542,866 B1
(45) Date of Patent: Apr. 1, 2003

(54) SPEECH RECOGNITION METHOD AND APPARATUS UTILIZING MULTIPLE FEATURE STREAMS

(75) Inventors: Li Jiang, Redmond, WA (US); Xuedong Huang, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/401,635

(22) Filed: Sep. 22, 1999

(51) Int. Cl.[7] .......... G10L 15/14; G10L 15/12; G10L 15/02
(52) U.S. Cl. .......... 704/255; 704/241; 704/242; 704/240; 704/257; 704/256
(58) Field of Search .......... 704/240, 239, 704/242, 254, 255, 256, 236, 238, 241, 251–257

(56) References Cited

U.S. PATENT DOCUMENTS

| | | | | |
|---|---|---|---|---|
| 5,506,933 A | * | 4/1996 | Nitta ........................... | 704/204 |
| 5,515,475 A | | 5/1996 | Gupta et al. ................ | 395/2.51 |
| 5,555,344 A | | 9/1996 | Zunkler ....................... | 704/231 |
| 5,617,509 A | * | 4/1997 | Kushner et al. ............ | 704/251 |
| 5,680,509 A | * | 10/1997 | Gopalakrishnan et al. .. | 704/231 |
| 5,758,027 A | | 5/1998 | Meyers et al. ................ | 395/21 |
| 5,764,853 A | * | 6/1998 | Watari et al. ................ | 704/243 |
| 5,865,626 A | | 2/1999 | Beattie et al. ............... | 434/185 |
| 6,067,515 A | * | 5/2000 | Cong et al. .................. | 704/222 |
| 6,278,970 B1 | * | 8/2001 | Milner ........................ | 704/203 |

FOREIGN PATENT DOCUMENTS

| | | |
|---|---|---|
| EP | 0 720 147 A1 | 12/1995 |
| EP | 0 831 456 A2 | 9/1997 |
| WO | WO 96/08005 | 7/1995 |

OTHER PUBLICATIONS

"Heterogeneous Acoustic Measurements for Phonetic Classification", Andrew K. Halberstadt et al., Proc. Eurospeech pp. 401–404 (1997).

"Heterogeneous Measurements and Multiple Classifiers for Speech Recognition", Andrew K. Halberstadt et al., Proc. of IC SLP–98, 4 pages (1998).

A.K. Halberstadt and J.R. Glass, "Heterogeneous Measurements and Multiple Classifiers for Speech Recognition", to appear in International Conference on Spoken Language Processing (ICSLP '98), Australia, 4 pages (Nov. 1998).

A.K. Halberstadt and J.R. Glass, "Heterogeneous Acoustic Measurements for Phonetic Classification", in Proceedings of the 5th European Conference on Speech Communication and Technology (Eurospeech–97), Rhodes, Greece, p. 401–404, (Sep. 1997).

(List continued on next page.)

*Primary Examiner*—David D. Knepper
*Assistant Examiner*—Abul K. Azad
(74) *Attorney, Agent, or Firm*—Theodore M. Magee; Westman, Champlin & Kelly, P.A.

(57) ABSTRACT

A method and apparatus is provided for using multiple feature streams in speech recognition. In the method and apparatus, a feature extractor generates at least two feature vectors for a segment of an input signal. A decoder then generates a path score that is indicative of the probability that a word is represented by the input signal. The path score is generated by selecting the best feature vector to use for each segment. For each segment, the corresponding part in the path score for that segment is based in part on a chosen segment score that is selected from a group of at least two segment scores. The segment scores each represent a separate probability that a particular segment unit (e.g. senone, phoneme, diphone, triphone, or word) appears in that segment of the input signal. Although each segment score in the group relates to the same segment unit, the scores are based on different feature vectors for the segment.

33 Claims, 6 Drawing Sheets

OTHER PUBLICATIONS

"Multi–Resolution Phonetic/Segmental Features and Models for HMM–Based Speech Recognition", IEEE International Conference on Acoustics, Speech, and Signal Processing (ICASSP), pp. 1263–1266 (1997).

"A Unified Way in Incorporating Segmental Feature and Segmental Model into HMM", Proceedings of the International Conference on Acoustics, Speech, and Signal Processing (ICASSP), pp. 532–535 (1995).

* cited by examiner

SPEECH RECOGNITION METHOD AND APPARATUS UTILIZING MULTIPLE FEATURE STREAMS

BACKGROUND OF THE INVENTION

The present invention relates to speech recognition. In particular, the present invention relates to the use of features to perform speech recognition.

In speech recognition systems, an input speech signal is converted into words that represent the verbal content of the speech signal. This conversion begins by converting the analog speech signal into a series of digital values. The digital values are then passed through a feature extraction unit, which computes a sequence of feature vectors based on the digital values. Each feature vector represents a section of the speech signal.

The feature vectors can represent any number of available features extracted through known feature extraction methods such as Linear Predictive Coding (LPC), LPC derived cepstrum, Perceptive Linear Prediction (PLP), Auditory model, and Mel-Frequency Cepstrum Coefficients (MFCC).

The feature vectors are then applied to an acoustic model that describes the probability that a feature vector was produced by a particular word, phoneme, or senone. Based on a sequence of these probabilities, a decoder identifies a most likely word sequence for the input speech signal.

Although many features may be extracted from the speech signal, most prior art systems only produce feature vectors associated with a single "best" feature. When speech recognition systems were first developed, filter-banks where used to extract the single feature used in recognition. Later, linear predictive coding was viewed as providing the best feature for speech recognition. In recent years, many speech systems have used Mel-Frequency Cepstrum Coefficients to provide the "best" feature for speech recognition.

Although a single feature can provide fairly good speech recognition results, systems that use a single feature for all speech recognition implicitly compromise some aspects of their performance. In particular, a single feature cannot be the best feature for recognizing each possible phone. Instead, the selected feature is generally designed to provide the best average performance across all phones. For some phones, other features would provide better speech recognition results than the selected feature.

To address this problem, some prior art systems have tried to use multiple features during recognition. In one system, this involved assigning a feature to a class of phones. For example, vowel sounds would be associated with one feature and fricatives would be associated with a different feature. However, this combination of features is less than desirable because it forces a feature on a phone regardless of the location of the phone in the speech signal. Just as a single feature does not provide optimum performance for all classes of phones, a single feature does not provide optimum performance for all locations of a phone. In addition, the feature associated with each class is chosen by the designer of the system and thus may not always be the best choice for the class.

Other systems have tried to use multiple features by combining probability scores associated with different features. In such systems, separate scores are calculated based on each feature. Thus, if three features are being used, three probability scores will be determined for each segment of the speech signal.

In one system, these probability scores are combined using a voting technique. Under the voting technique, each feature is used to identify a sub-word unit for each segment of the speech signal. The sub-word units are then compared to each other. If one sub-word unit is found more often than others, that sub-word unit is selected for the speech segment. If there is a tie between sub-word units, the sub-word unit associated with a particular feature is selected based on a ranking of the features.

In another prior art speech recognition system, the probability scores are combined by taking the weighted sum of the scores produced by each feature. This weighted sum then represents the probability that the segment of the speech signal represents a particular sub-word unit. Other prior art speech recognition systems combine the probability scores by multiplying the scores from each individual feature together. The product then represents the probability that the segment of the speech signal represents a particular sub-word unit.

Such combination systems are not ideal because the scores associated with an optimum feature for a phone are obscured by the addition of scores associated with less than optimum features.

SUMMARY OF THE INVENTION

A method and apparatus is provided for using multiple feature streams in speech recognition. In the method and apparatus a feature extractor generates at least two feature vectors for a segment of an input signal. A decoder then generates a path score that is indicative of the probability that a word is represented by the input signal. The path score is generated by selecting the best feature vector to use for each segment. For each segment, the corresponding part in the path score for that segment is based in part on a chosen segment score that is selected from a group of at least two segment scores. The segment scores each represent a separate probability that a particular segment unit (e.g. senone, phoneme, diphone, triphone, or word) appears in that segment of the input signal. Although each segment score in the group relates to the same segment unit, the scores are based on different feature vectors for the segment.

In one embodiment, an iterative method is used to select the feature to use for each segment and to conduct decoding using the chosen segment scores. In the iterative method, a first-pass feature is used to decode a possible segment unit for each segment. A set of segment scores are then determined for the possible segment unit using a set of different feature vectors for the segment. The feature vector that provides the highest score is then associated with the segment.

A second decoding pass is then performed using the individual feature vectors that have been assigned to each segment. This second decoding can produce new segmentation and can provide a revised segment unit for each segment. A group of segment scores is then determined for the revised segment unit, in each segment using the set of feature vectors for the segment. The feature vector associated with the highest score for each segment is selected to use for decoding. Under one embodiment, the process of assigning features to segments and decoding the speech signal using the assigned features is repeated until the recognizer output does not change between iterations.

In other, embodiments, the selection of a best feature for a segment is built into the selection of a best path score for a sequence of words—namely, the decoding process. In some of these embodiments, this is accomplished by forming segment unit/feature pairs for each segment and selecting a sequence of pairs that provide the best overall path score. In most embodiments, the selection is based on the optimal score for the whole utterance. All possibilities are considered and a decision on the best path is generally not made until the end of the utterance. It is believed that this technique provides the best score for the whole utterance.

DETAILED DESCRIPTION OF ILLUSTRATIVE EMBODIMENTS

Figure 1:
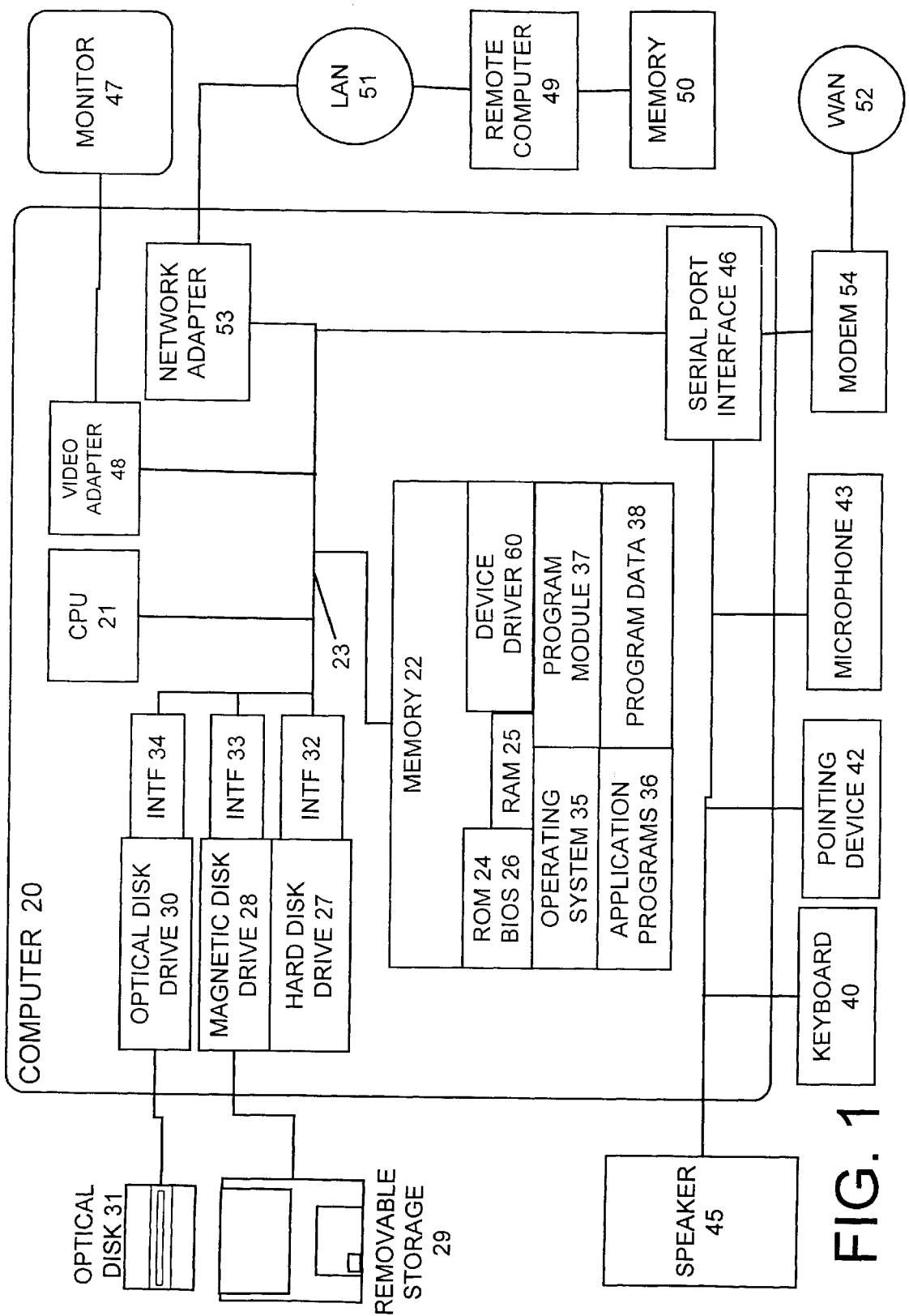
FIG. 1 is a plan view of a general computing environment in which one embodiment of the present invention is used.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus., and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs) read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets, and the Internet.

When used in a LAN networking environment, the personal computer 20 is connected to the local area network 51 through a network interface or adapter 53 When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Although FIG. 1 shows an exemplary environment, the present invention is not limited to a digital-computing environment. In particular, the present invention can be operated on analog devices or mixed signal (analog and digital) devices. Furthermore, the present invention can be implemented on a single integrated circuit, for example, in small vocabulary implementations.

Figure 2:
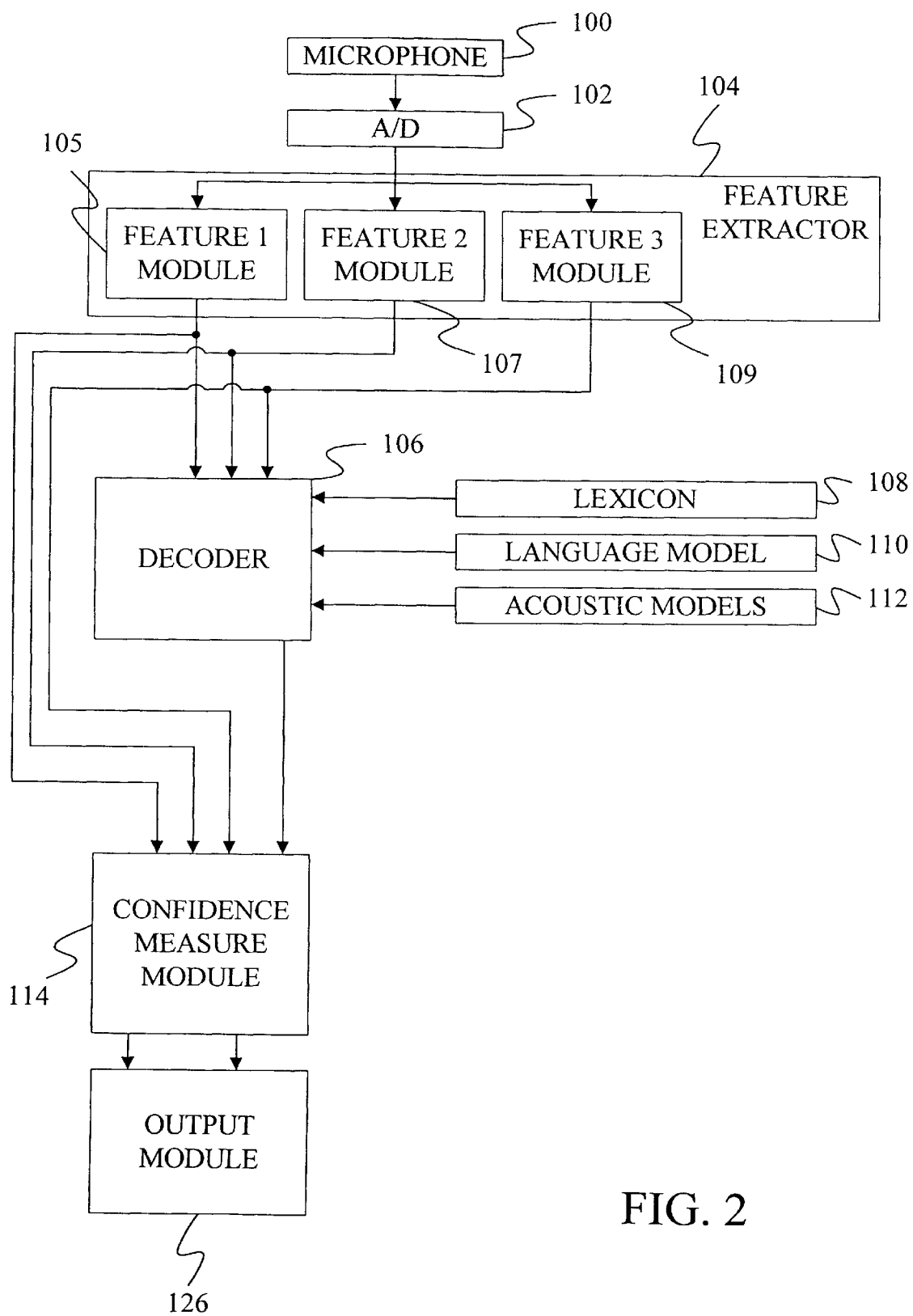
FIG. 2 is a block diagram of A speech recognition system of an embodiment of the present invention.

FIG. 2 provides a more detailed block diagram of modules of the general environment of FIG. 1 that are particularly relevant to the present invention. In FIG. 2, an input speech signal is converted into an electrical signal by a microphone 100, which is connected to an analog-to-digital (A-to-D) converter 102. A-to-D converter 102 converts the analog signal into a series of digital values. In several embodiments, A-to-D converter 102 samples the analog signal at 16 kHz thereby creating 16 kilobytes of speech:data per second.

The digital data created by A-to-D converter 102 is provided to a feature extractor 104 that extracts multiple features from the digital speech signal. In particular, feature extractor 104 contains a plurality of feature extraction modules 105, 107, and 109. Although three feature extraction modules are shown in FIG. 2, embodiments of the present invention may include any number of feature extraction modules as long as there are more than two modules.

Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

In one embodiment of the invention, each module represents a unique extraction technique within feature extractor 104. Thus, for example, feature extraction module 105 uses Linear Predictive Coding, module 107 uses Perceptive Linear Prediction, and module 109 uses MFCC. In an alternative embodiment, at least two of the modules share the same basic extraction technique but use different parameters within the technique. For example, in one embodiment, feature extraction modules 105 and 107 both use MFCC but use different sized sampling windows. Because the parameters are different in the two modules, the features extracted by the two modules are different.

Each of the feature extraction modules receives the stream of digital values from A-to-D converter 102, and each produces a stream of feature vectors. Each feature vector is associated with a frame of the speech signal, which in many embodiments is 1 milliseconds long. Although each feature vector is associated with an identical frame, the feature vectors can be based on different sampling window sizes as shown in FIG. 3.

Figure 3:
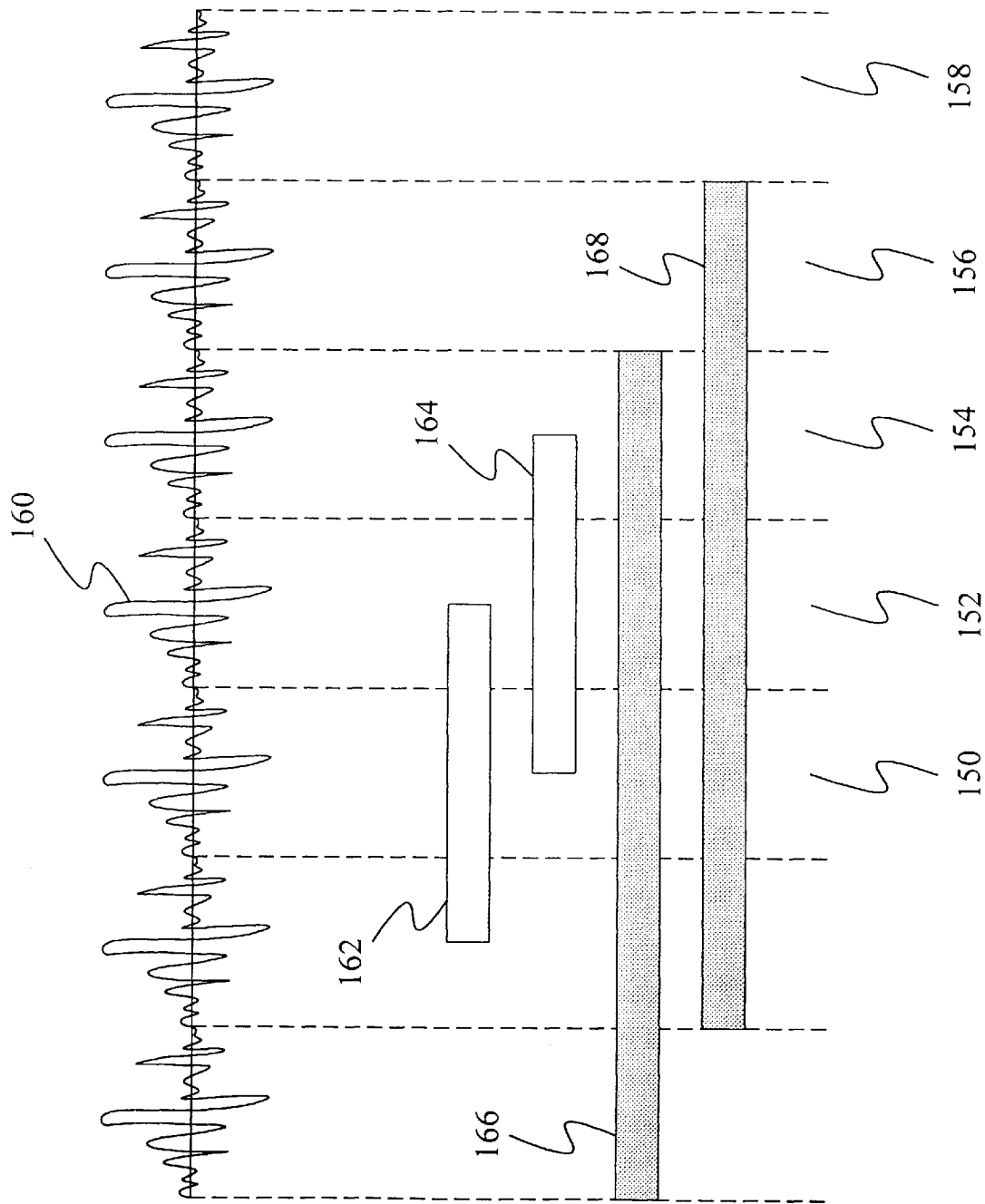
FIG. 3 is a timing diagram showing different sized sampling windows associated with different extraction modules.

FIG. 3 is a timing diagram showing a set of frames 150, 152, 154, 156, and 158 of a speech signal 160. FIG. 3 also shows a set of sampling windows 162 and 164 that are associated with a first feature extraction module and a second set of sampling windows 166 and 168 that are associated with a second feature extraction module. Sampling windows 162 and 166 are each centered on frame 150 and sampling windows 164 and 168 are each centered on frame 152.

Each sampling window provides information for a feature vector that is associated with the frame on which the sampling window is centered. Thus, sampling window 162 provides information for a feature vector associated with frame 150 and sampling windows 164 provides information for a feature vector associated with frame 152. Similarly, although they are much larger than sampling windows 162 and 164, sampling windows 166 and 168 provide information for feature vectors associated with frames 150 and 152, respectively.

Returning to FIG. 2, the streams of feature vectors produced by the extraction modules are provided to a decoder 106, which identifies a most likely sequence of words based on the streams of feature vectors, acoustic models 108, a language model 110, and a lexicon 112.

Acoustic models 108 provide acoustic scores, for example log likelihoods, that describe the likelihood that a series of feature vectors was created by a particular series of linguistic units, such as a series of senones, phonemes, noise phones, diphones, or triphones. (Note that in the context of this application, such linguistic units are sometimes referred to using the generic term "segment units.") Within acoustic models 108, there is a separate model for each feature extracted by feature extractor 104. Each model is trained based on a feature extraction method and training data. Examples of acoustic models 108 include discrete, semi-continuous or continuous density Hidden Markov Models (HMM) that provide log-likelihoods for a number of different sequences of linguistic units given a series of feature vectors.

Language model 110 provides a set of likelihoods that a particular sequence of words will appear in the language of interest. In many embodiments, the language model is based on a text database such as the North American Business News (NAB), which is described in greater detail in a publication entitled CSR-III Text Language Model, University of Penn., 1994. The language model may be a context-free grammar or a statistical N-gram model such as a trigram. In one embodiment, the language model is a compact trigram model that determines the probability of a sequence of words based on the combined probabilities of three-word segments of the sequence.

Based on the acoustic models, the language model, and the lexicon, decoder 106 computes the acoustic and language model score for all possible word sequences. Decoder 106 then selects the most probable sequence of words and/or noises, which it provides at its output along with the acoustic scores and language scores associated with those words and/or noises. The particular methods used to generate the acoustic scores and to select the most probable sequence of words is discussed further below.

The most probable sequence of hypothesis words and the acoustic and language scores associated with those words are provided to confidence measure module 114, which also receives the feature vectors produced by feature extractor 104. Confidence measure module 114 identifies which words are most likely to have been improperly identified by the speech recognizer, based in part on a secondary acoustic model. Confidence measure module 114 then provides the sequence of hypothesis words to an output module 126 along with identifiers indicating which words may have been improperly identified.

Under embodiments of the present invention, decoder 106 identifies the most probable sequence of hypothesis words based on a combination of different features from feature extractor 104. Specifically, decoder 106 uses different features at different points in the speech signal. In one embodiment, decoder 106 selects its features on a per frame basis. In other embodiments, decoder 106 selects features on a senone, phoneme, diphone, triphone or word basis. In all such embodiments, a single feature is not tied directly to a class of linguistic units. For example, a single feature is not tied directly to a class of phonemes or a class of words.

Instead, the speech signal is used directly to determine which feature is best able to identify the most likely sequence of words.

Figure 4:
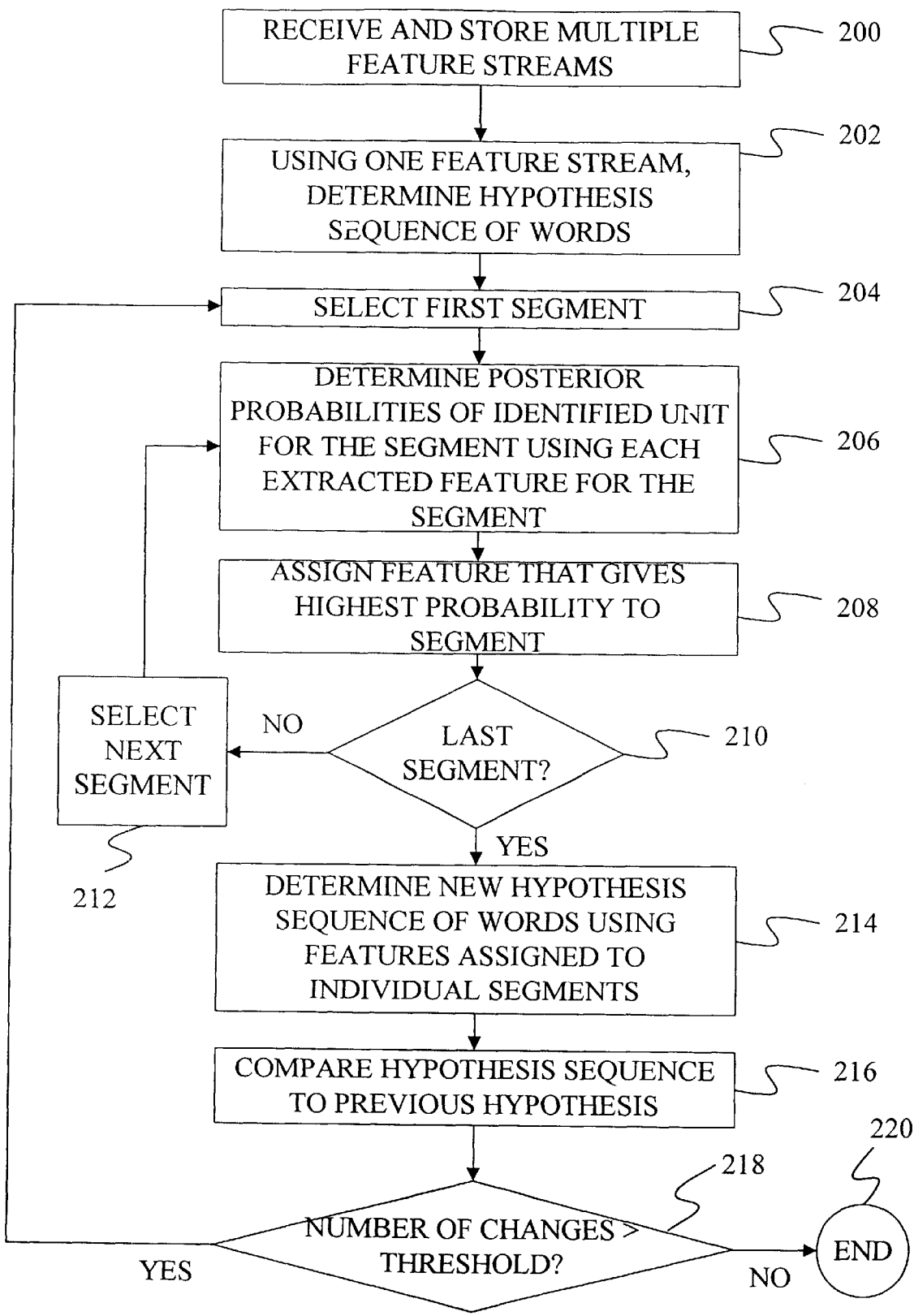
FIG. 4 is a flow diagram of a method of one embodiment of the present invention for using multiple feature streams in speech recognition.

FIG. 4 provides a flow diagram of one decoding method used by decoder 106 under an embodiment of the present invention. In step 200 of FIG. 4, decoder 106 receives and stores the multiple feature streams provided by feature extractor module 104. At step 202, decoder 106 selects one of the feature streams to determine a hypothesis sequence of words by performing decoding. Thus, in step 202, every segment of the speech signal is decoded using feature vectors from the same feature extraction module in feature extractor 104.

At step 204, decoder 106 selects the first segment of the speech signal. This segment has an associated hypothesis segment unit that was determined in step 202. At step 206, decoder 106 retrieves the feature vectors produced by each of the extraction modules for the selected segment. Thus, if there are three separate features generated by LPC, PLP, and MFCC, respectively, three feature vectors are retrieved. Decoder 106 then uses the retrieved feature vectors and the respective acoustic models associated with the features to determine a set of posterior probabilities. Each individual probability is the probability that the hypothesis segment unit was uttered given the respective feature vector. Using the features noted above, this would result in a probability for the hypothesis segment unit given the LPC feature vector, the probability of the hypothesis segment unit given the PLP feature vector, and the probability of the hypothesis segment unit given the MFCC feature vector.

In one embodiment, the posterior probability determined for each feature vector is defined as:

$$p(hseg \mid a) = \frac{p(a \mid hseg) \cdot p(hseg)}{p(a)} \quad \text{EQ. 1}$$

where p(hseg|a) is the probability of the hypothesis segment unit, hseg, given the feature vector, a; p(a|hseg) is the probability of the feature vector, a, being produced by the hypothesis segment unit, hseg; p(hseg) is the probability of the hypothesis segment unit appearing in an utterance; and p(a) is the probability of the feature vector, a, appearing in an utterance.

Since the denominator on the right-hand side represents the total probability of the feature vector appearing in an utterance, Equation 1 is sometimes rewritten as:

$$p(hseg \mid a) = \frac{p(a \mid hseg) \cdot p(hseg)}{\sum_{\text{all segment units}} p(a \mid seg) \cdot p(seg)} \quad \text{EQ. 2}$$

where p(a|seg) is the probability of the feature vector being produced by a segment unit; and p(seg) is the probability of a segment unit appearing in the utterance.

When comparing the probabilities associated with the various feature vectors, a segment unit language model can be applied to determine the probability of the hypothesis segment unit appearing in an utterance, p(hseg), or this probability can be simplified to a uniform probability. Note that the probability of the feature vector occurring in the utterance, p(a), must be calculated for each feature vector and that this probability will be different for different features.

At step 208, decoder 106 compares the probabilities determined in step 206 to identify the feature vector that produces the highest probability for the hypothesis segment unit. The feature associated with the highest probability feature vector is then assigned to the segment. As discussed in more detail below, this assignment causes the feature to be used when generating a revised hypothesis segment unit for this segment.

At step 210, decoder 106 determines if this is the last segment of the utterance. If this is not the last segment, the next segment is selected at step 212 and the process returns to step 206 where a set of posterior probabilities is determined for this new segment. Steps 206, 208, 210, and 212 repeat, assigning features to each segment, until the last segment is reached at step 210. When the last segment is reached, the process continues at step 214.

In step 214, a new decoding is performed using the features assigned to the segments in step 208. This new decoding produces a new segmentation and a new hypothesis sequence of words. During the decoding, different features might be used for different segments. For example, if MFCC is assigned to the second segment in step 208, the MFCC feature vector and the MFCC acoustic model are used to compute the scores for all possible segment units of a particular type for the second segment. For example, in one embodiment, scores are computed for all possible phonemes for the second segment. Similarly, if LPC is assigned to the third segment in step 208, the LPC feature vector and the LPC acoustic model are used to compute the scores for all possible segment units for the third segment.

At step 216, the new hypothesis sequence of words is compared to the previous hypothesis sequence and the number of changes in the sequence is determined. If the number of changes is greater than a predetermined threshold at step 218, the process returns to step 204, where the first segment of the utterance is selected. Steps 206, 208, 210, 212, 214, 216, and 218 are then repeated using the new hypothesis sequence of words in place of the previous hypothesis sequence of words. The steps continue to be repeated until the number of changes in the sequence of words is below the threshold. When that occurs, the process ends at step 220.

In another embodiment of the invention, the feature is selected by augmenting the decoder search space with an additional dimension—namely, which feature to use for each segment. Using this augmented search space, the decoder inherently selects the best feature for a segment when it selects the best recognition path score.

The additional decoder dimension is added to the search space by creating feature/segment unit pairs in the decoder. The decoder then searches for the most probable sequence of feature/segment unit pairs. The details of such an embodiment are shown in the flow diagram of FIG. 5.

Figure 5:
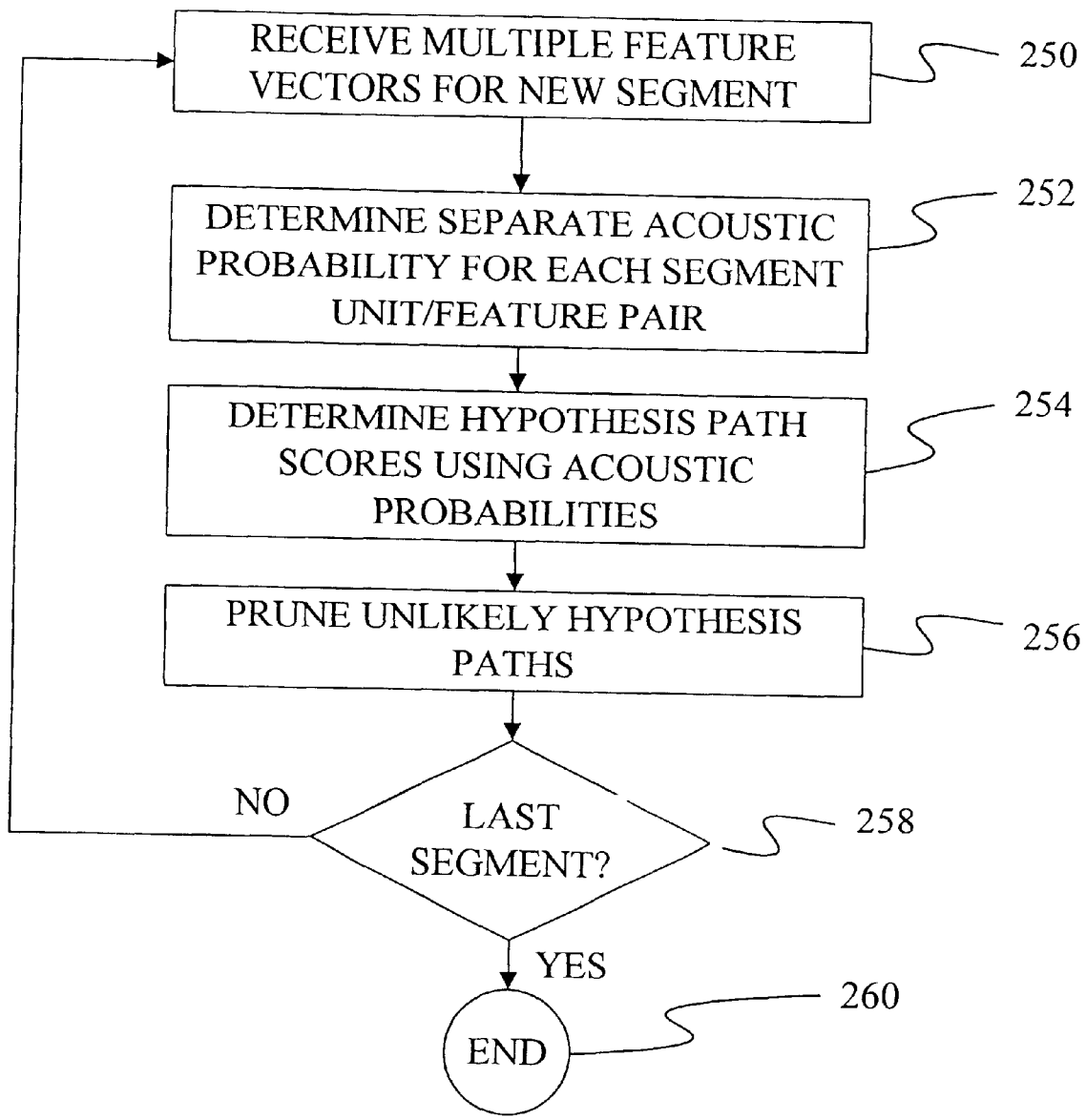
FIG. 5 is a flow diagram of a method of a second embodiment of the present invention for using multiple feature streams in speech recognition.

In step 250 of FIG. 5, a set of feature vectors, one for each feature, is received for the current segment of the speech signal. At step 252, a set of acoustic probabilities is determined for each of the feature vectors. Each set of acoustic probabilities includes an acoustic probability for each possible segment unit of a particular type (e.g. senone, phoneme, diphone, triphone, or word) given the respective feature vector. Thus, if the system is using LPC, PLP, and MFCC features, and the segment unit is a phoneme, the set of probabilities for the LPC feature includes an acoustic probability for each phoneme based on the LPC feature vector, the set of probabilities for the PLP feature includes an acoustic probability for each phoneme based on the PLP feature vector, and the set of probabilities for the MFCC feature includes an acoustic probability for each phoneme based on the MFCC feature vector. Since each probability is feature specific, the probability can be viewed as a probability for a feature/segment unit pair.

At step 254, decoder 106 uses each probability associated with the feature/segment unit pairs to determine a set of hypothesis path scores ending at the current segment. Specifically, for each hypothesis path ending at the previous segment, a new path score is calculated for each feature/segment unit pair of the current segment. Thus, if ten hypothesis paths ended at the previous segment, and there were one hundred and fifty feature/segment unit pairs at the current segment that can follow the previous hypothesis under the constraint created by the lexicon and the language model, one thousand five hundred (10×150) hypothesis path scores will be determined.

Figure 6:
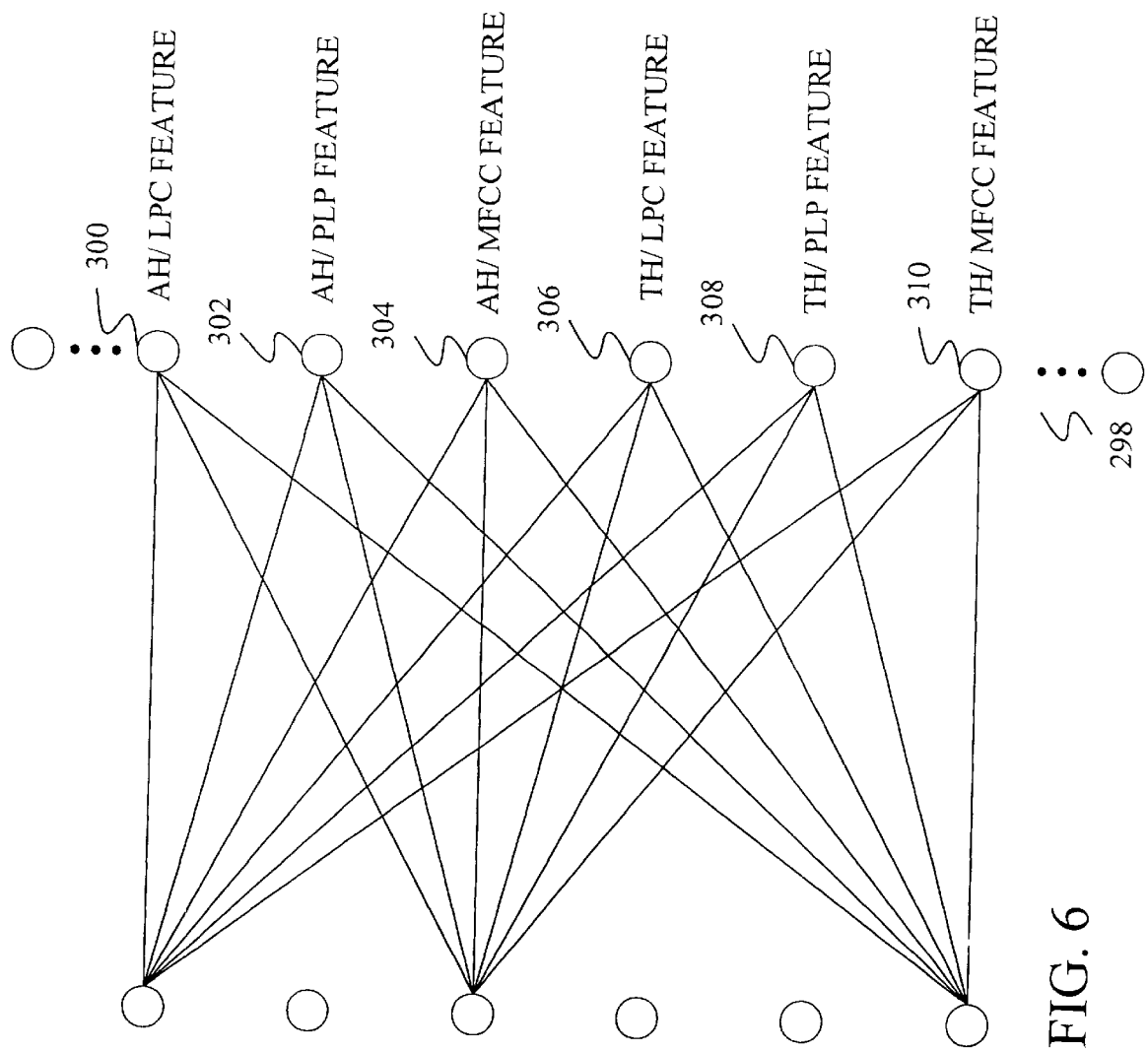
FIG. 6 is a portion of a trellis diagram of a decoder of one embodiment of the present invention.

FIG. 6 shows a portion of a trellis diagram showing a set of feature/segment unit pairs 300, 302, 304, 306, 308, and 310 for a current segment 298. The probabilities of feature/segment unit pairs 300, 302, and 304 are related to the occurrence of the "AH" phoneme in the utterance. However, the probabilities of feature/segment unit pairs 300, 302 and 304 are each based on different features. For example, in one embodiment, the probability of pair 300 is based on a LPC feature vector, the probability of pair 302 is based on a PLP feature vector, and the probability of pair 304 is based on a MFCC feature vector. Thus, although the feature/segment unit pairs represent the same segment unit, there may be different probabilities associated with each feature/segment unit pair. Similarly, the probabilities associated with feature/segment unit pairs 306, 308, and 310 each relate to the occurrence of the "Th" phoneme in the utterance, but each probability is based on a different feature vector.

In one embodiment., the probabilities of each pair are incorporated in hypotheses path scores that are compared to each other in order to get a recognition result W* with the highest path score:

$$W^* = \underset{W}{\mathrm{argmax}}\, p(W \mid A) \qquad \text{EQ. 3}$$

where W is a sequence of segment units, A is the acoustic observation and p(W|A) is the probability of W given A. Without dosing generality, we assume there are multiple feature streams $\{F_i\}$, $i \in [1, \ldots N]$ associated with A, and there are S phonetic or word segments for the utterance we are considering. Assuming accurate segmentation, we decompose Equation 3 into a summation of probabilities across all possible mixed feature stream paths as follows:

$$W^* = \underset{w}{\mathrm{argmax}} \sum_{I \in \psi} \prod_{k=1}^{S} p(W^k \mid F_{I_k}, A) p(F_{I_k} \mid A) \qquad \text{EQ. 4}$$

which can be approximated as:

$$W^* \cong \underset{w}{\mathrm{argmax}} \sum_{I \in \psi} \prod_{k=1}^{S} p(W^k \mid F_{I_k}) p(F_{I_k} \mid A) \qquad \text{EQ. 5}$$

where $\psi$ is a set that contains all the possible feature stream permutation paths from the 1$^{st}$ to the Sth segment, I represents one such feature stream path such that $I=(I_1, I_2 \ldots I_k)$, where $I_K \in [1, \ldots N]$, $F_{I_k}$ denotes the acoustic feature in the kth segment, $W^k$ denotes the corresponding segment unit in the kth segment, $p(F_{I_k}|A)$ is the probability of a particular feature in segment k given speech signal A, and $p(W^k|F_{I_k})$ is the probability of a segment unit $W^k$ for the kth segment given the feature vector, $F_{I_k}$, for the kth segment.

Equation 5 implies that the best word sequence should be the one that has the highest overall posterior probability for all the possible feature stream combinations for the given utterance.

One way to approximate Equation 5 is to find the maximum term of each summation and to represent each summation by this one term. Thus, Equation 5 becomes:

$$W^* = \underset{w}{\mathrm{argmax}} \left\{ \max_{I} \prod_{k=1}^{S} p(W^k \mid F_{I_k}) p(F_{I_k} \mid A) \right\} \qquad \text{EQ. 6}$$

where max$_I$ indicates the maximum term of each summation of Equation 5.

The maximum term of Equation 5 is generated for a sequence of segment units when the path of features provides the highest probability for each individual segment unit. Thus equation 6 becomes:

$$W^* = \underset{w}{\mathrm{argmax}} \left\{ \prod_{k=1}^{S} \max_{i} p(W^k \mid F_{i_k}) p(F_{i_k} \mid A) \right\} \qquad \text{EQ. 7}$$

where $i \in [1 \ldots N]$.

Equation 7 is equivalent to finding the highest probability $p(W^k|F_{i_k})p(F_{i_k}|A)$ for each segment while allowing feature switching between different segments in the same fashion as a beam search algorithm.

In practice, $p(W^k|F_{I_k})$ can be rewritten in terms of an acoustic model probability $p(F_{I_k}|W^k)$ and a language model probability $p(W^k)$ as follows:

$$p(W^k \mid F_{i_k}) = \frac{p(F_{i_k} \mid W^k) * p(W^k)}{p(F_{i_k})} \qquad \text{EQ. 8}$$

where $p(W^k|F_{i_k})$ is the probability of the kth segment unit $W^k$, given the a feature vector $F_{i_k}$; $p(F_{i_k}|W^k)$ is the probability of the feature vector $F_{i_k}$ being generated by segment unit $W^k$; $p(W^k)$ is the probability of the hypothesis segment unit $W^k$ appearing given the history of segment unit sequences; and $p(F_{i_k})$ is the probability of the feature vector $F_{i_k}$ occurring in the utterance.

In Equation 8, $p(F_{i_k}|W^k)$ can be readily obtained from feature vector $F_{i_k}$ and its corresponding acoustic model. $P(W^k)$ can be obtained from the language model. $P(F_{i_k})$ can be approximated in various ways. In one embodiment, it can be approximated by using phone probabilities at the frame level.

$$p(F_l^k) = \prod_{n=1}^{N} \sum_{m=1}^{M} p(F_{i_n} \mid m) \qquad \text{EQ. 9}$$

where N is the total number of frames in segment k, and M is the total number of phones.

Note that $F_{i_k}$ in equation 8 is not limited to any particular feature and that different segments can have different features. Thus, for one segment, the feature vector can be based on a LPC feature and for the next segment the feature vector can be based on a MFCC feature. The feature chosen for a segment is the feature that maximizes the probability $p(W^k|F_{i_k})$ for all possible features, as shown in Equation 7.

In above framework, the segment could be a HMM state, a phone or a word. As such, in some embodiments, the feature vectors do not switch between feature streams within a phone, or in some embodiments within a word. Additional or different transition penalties can be applied to the sequence of feature vectors. For example, a transition penalty can be applied that allows some transitions between feature streams within words but that "discourages" such transitions from occurring.

Weight probability $p(F_{i_k}|A)$ in Equation 7 can also be approximated. In one embodiment, it can be assumed to be uniformly distributed to all feature streams. In another embodiment, a confidence measure can be used to derive weights as approximations of the probability $p(F_{i_k}|A)$. There are many ways to obtain confidence scores, and in general the higher the confidence score, the higher the weight probability. In another embodiment, an error rate is transformed into the weight probability $p(F_{i_k}|A)$. If the feature has a high error rate, it will be "discounted" in the decoding process, as it is not as reliable as other features.

Returning to FIG. 5, once the hypothesis path scores have been determined at step 254, unlikely paths are pruned from the search at step 256. Under one embodiment of the invention, this pruning is done on a feature-by-feature basis. Specifically, the pruning is performed so that there is roughly the same number of paths ending at feature/segment unit pairs for each feature.

This can be accomplished by separately identifying the highest probability paths that end with each feature. Thus, if LPC, PLP, and MFCC features are being used, the highest probability path that ends in a LPC feature/segment unit pair would be determined separately from the highest probability paths that end in a PLP feature/segment unit pair or a MFCC feature/segment unit pair. Hypothesis paths are then compared to the highest probability path that shares the same ending feature. A separate beam width is then determined for each feature to ensure that roughly the same number of paths end at feature/segment unit pairs of each feature.

After pruning step 256 of FIG. 5, decoder 106 determines if this is the last frame of the utterance at step 258. If this is not the last frame, the process returns to step 250, where the feature vectors for the next frame are received. Steps 250, 252, 254, 256, and 258 repeat until every frame has been processed and a most likely sequence of words has been determined. The process then ends at step 260.

In further embodiments of the invention, the process of FIG. 5 is extended to include selecting one acoustic model from a set of acoustic models at each segment. In one particular embodiment, speaker-clustered models are generated using a collection of speakers. Each clustered model is trained by a different collection of speakers and thus each model generates different probabilities for the same feature vector. Based on these different probabilities, hypothesis paths are generated such that two different paths select the same phone in the same segment but assign different probabilities to that phone. By selecting the most probable hypothesis path, the system inherently selects the most appropriate clustered acoustic model for the segment. As with the multiple feature streams, the calculation of the hypothesis path scores can include penalties for switching between acoustic models between phones in the same word or sub-word. This will usually result in a single clustered acoustic model being used for an entire word or sub-word.

In another embodiment, microphone-dependent models are generated using data samples collected with different microphones. Each microphone-dependent model is trained by data associated with that particular microphone. Therefore, each model generates different probabilities for the same feature vector. When a new microphone is used, the characteristics of the new microphone for different acoustic units might match different training microphones best. Thus, selecting the most probable hypothesis path using multiple microphone-dependent models provides the best match between the acoustic models and the new unseen microphone.

In other embodiments, the method of FIG. 5 is extended to use multiple speech recognition systems. Each system includes its own feature extraction, acoustic models and language models. Although systems may share one or more of these components, the combination of components found in any one system is unique While decoding, the decoder generates hypothesis paths using different systems. In general, the paths are limited so that the decoder does not switch between systems within a word. However, different systems can be selected for different words in the same utterance.

Although the present invention has been described with reference to particular embodiments, workers skilled in the art will recognize that changes may be made in form and detail without departing from the spirit and scope of the invention.

What is claimed is:

1. A speech recognition system for identifying words from a series of digital values representing speech, the system comprising:
   a first feature extractor for generating a first feature vector for a segment using a first type of feature of a portion of the series of digital values;
   a second feature extractor for generating a second feature vector for the same segment as the first feature extractor using a second type of feature of a portion of the series of digital values;
   a decoder capable of generating a path score that is indicative of the probability that a sequence of words is represented by the series of digital values, the path score being based in part on a single chosen segment score selected from a group of at least two segment scores wherein each segment score in the group represents a separate probability of a same segment unit appearing within a segment but wherein each segment score in the group is based on a different feature vector formed using a different type of feature for the same segment.

2. The speech recognition system of claim 1 wherein the decoder is further capable of generating multiple path scores, each path score indicative of a separate probability that a separate sequence of words is represented by the series of digital values input signal.

3. The speech recognition system of claim 2 wherein one path score is generated by selecting one segment score from a group and a second path score is generated by selecting a second segment score from the same group.

4. The speech recognition system of claim 2 wherein the decoder is further capable of pruning at least one path score, the pruning performed by grouping together into pruning groups those path scores that use a same, feature vector to determine the last chosen segment score in the path score.

5. The speech recognition system of claim 4 wherein different pruning groups of path scores are pruned using different beam widths.

6. The speech recognition system of claim 1 wherein the path score is based in part on two chosen segment score for two adjacent segment, wherein one of the two chosen segment score is based on a feature and the other of the two chosen segment score is based on a feature vector that is extracted using a second type of feature.

7. The speech recognition system of claim 6 wherein generating the path score further comprises reducing the path score if the path score includes two chosen segment scores from two adjacent segments that are based on feature vectors extracted using different types of features.

8. The speech recognition system of claim 7 wherein a segment is a phoneme.

9. The speech recognition system of claim 7 wherein a segment is a word.

10. The speech recognition system of claim 1 wherein the first type of feature is defined by applying a first set of parameters to a feature extraction technique and the second type of feature is defined by applying a second set of parameters to the same feature extraction technique as the first type of feature.

11. The speech recognition system of claim 10 wherein the parameters associated with the first type of feature comprise a first sampling window size and the parameters associated with the second type of feature comprise a second sampling window size.

12. The speech recognition system of claim 1 wherein the decoder is further capable of selecting the segment score using a method comprising:

identifying a possible segment unit for a segment using a feature vector that is based on a first-pass feature type;

determining a group of segment scores for the possible segment unit using a plurality of feature vectors that are based on separate feature types;

selecting the best segment score and designating the segment score's associated feature type as the segment's feature type;

determining a revised segment unit for the segment using a feature vector that is based on the segment's feature type;

determining a group of segment scores for the revised segment unit using a plurality of feature vectors that are based on separate feature types; and selecting the best segment score for the revised segment unit as the chosen segment score.

13. The speech recognition system of claim 12 wherein the decoder is further capable of designating the feature associated with the best segment score as the segment's feature and of again determining a revised segment unit, determining a group of segment scores, and selecting a best segment score.

14. A method of speech recognition comprising:

extracting at least two feature vectors for a segment from a series of digital values each feature vector being associated with a different type of feature; and determining a path score that is indicative of the probability that a word is represented by the series of digital values through a method comprising:

using different feature vectors, each produced from different types of features for a same segment, to determine a group of segment scores that each represent a separate probability of a same segment unit appearing within a segment;

selecting one of the segment scores from the group as a chosen segment score; and combining chosen segment scores from multiple segments to produce a path score for a word.

15. The method of claim 14 further comprising determining multiple path scores, one for each of a set of hypothesis words.

16. The method of claim 15 further comprising pruning at least one path score.

17. The method of claim 16 wherein pruning at least one path score comprises:

grouping path scores into feature groups based on the type of feature associated with the last segment score used to produce the respective path scores;

determining a highest path score within each group; and pruning path scores in each group that are more than a beam width different from the highest path score in each group, each beam width being set independently for each group.

18. The method of claim 15 wherein determining multiple path scores comprises:

selecting a first segment score from the group as a chosen segment score for a first path score; and selecting a second segment score from the group as a chosen segment score for a second path score.

19. The method of claim 14 wherein combining segment scores from multiple segments comprises combining chosen segment scores from two adjacent segments and wherein one of the two chosen segment scores is based on a feature vector that is extracted using a first feature and the other of the two chosen segment scores is based on a feature vector that is extracted using a second feature.

20. The method of claim 19 wherein combining the segment scores comprises reducing the path score if the path score includes two chosen segment scores from two adjacent segments that are based on feature vectors extracted using different features.

21. The method of claim 20 wherein the segment represents a phoneme.

22. The method of claim 20 wherein the segment represents a word.

23. The method of claim 14 wherein extracting at least two feature vectors comprises extracting a first feature vector using a first feature extraction technique with a first set of parameters and extracting a second feature vector using the first feature extraction technique with a second set of parameters.

24. The method of claim 23 wherein the first set of parameters and the second set of parameters comprise a sampling window size.

25. The method of claim 14 wherein using different feature vectors of a segment to determine a group of segment scores and selecting one of the segment scores as a chosen segment score comprise:

identifying a possible segment unit for a segment using a feature vector that is based on a first-pass feature;

determining a group of segment scores for the possible segment unit using a plurality of feature vectors that are based on separate features;

selecting the best segment score and designating the segment scorer's associated feature as the segment's feature;

determining a revised segment unit for the segment using a feature vector that is based on the segment's feature;

determining a group of segment scores for the revised segment unit using a plurality of feature vectors that are based on separate features; and selecting the best segment score for the revised segment unit as the chosen segment score.

26. The method of claim 25 further comprising designating the feature associated with the best segment score as the segment's feature and again determining a revised segment unit, determining a group of segment scores, and selecting a best segment score.

27. A computer-readable medium having computer-executable instructions for performing steps comprising:

receiving a digital signal representative of an input speech signal;

extracting at least two feature vectors for a frame of the digital signal; and determining a path score that is indicative of the probability that a word is represented by the digital signal through steps comprising:

using different feature vectors of a frame to determine a group of segment scores that each represent a separate probability of a same segment unit appearing within a segment;

selecting one of the segment scores from the group as a chosen segment score; and combining chosen segment scores from multiple segments to produce a path score for a word.

28. An apparatus for converting a speech signal into text, the apparatus comprising:

a first speech recognition system having a feature extractor, an acoustic model for each linguistic unit of a language, and a language model and being capable of generating a first word score from a first portion of the speech signal;

a second speech recognition system having a feature extractor, an acoustic model for each linguistic unit of a language, and a language model and being capable of generating a second word score from a second portion of the speech signal, the second speech recognition system being different from the first speech recognition system; and a decoder capable of combining the first word score and the second word score to form a hypothesis path score and further capable of selecting a single path score from a group of hypothesis path scores to identify the text.

29. The apparatus of claim 28 wherein the first speech recognition system comprises a first feature extractor, a common acoustic model and a common language model and wherein the second speech recognition system comprises the common acoustic model, the common language model and a second feature extractor that is different from the first feature extractor.

30. The apparatus of claim 28 wherein the first speech recognition system comprises a common feature extractor, a first acoustic model and a common language model and wherein the second speech recognition system comprises the common feature extractor, the common language model and a second acoustic model that is different from the first acoustic model.

31. The apparatus of claim 30 wherein the first acoustic model comprises a speaker-clustered model and the second acoustic model comprises a speaker-clustered model.

32. The apparatus of claim 30 wherein the first acoustic model comprises a microphone-dependent model and the second acoustic model comprises a microphone-dependent model.

33. The apparatus of claim 28 wherein the first speech recognition system comprises a common feature extractor, a common acoustic model and a first language model and wherein the second speech recognition system comprises the common feature extractor, the common acoustic model and a second language model that is different from the first language model.

* * * * *

UNITED STATES PATENT AND TRADEMARK OFFICE
CERTIFICATE OF CORRECTION

PATENT NO. : 6,542,866 B1
DATED : April 1, 2003
INVENTOR(S) : Jiang et al.

It is certified that error appears in the above-identified patent and that said Letters Patent is hereby corrected as shown below:

Column 2,
Line 29, after "apparatus" insert -- , --.
Line 57, after "unit" delete ",".

Column 3,
Line 13, replace "A" with -- a --.

Column 4,
Line 52, after "53" insert -- . --.

Column 5,
Line 48, replace "1" with -- 10 --.

Column 9,
Replace Eq. 3 with -- $W^* = \arg\max_W p(W|A)$ --.

Line 38, replace "dosing" with -- losing --.
Line 39, replace "I" with -- 1 --.
Replace Eq. 4 with $$-- W^* = \arg\max_w \sum_{I \in \Psi} \prod_{k=1}^{S} p(W^k|F_{I_k}, A) p(F_{I_k}|A) --.$$

Replace Eq. 5 with $$-- W^* \cong \arg\max_w \sum_{I \in \Psi} \prod_{k=1}^{S} p(W^k|F_{I_k}) p(F_{I_k}|A) --.$$

Column 10,
Replace Eq. 6 with $$-- W^* = \arg\max_w \left\{ \max_I \prod_{k=1}^{S} p(W^k|F_{I_k}) p(F_{I_k}|A) \right\} --.$$

Replace Eq. 7 with $$-- W^* = \arg\max_w \left\{ \prod_{k=1}^{S} \max_i p(W^k|F_{i_k}) p(F_{i_k}|A) \right\} --.$$

UNITED STATES PATENT AND TRADEMARK OFFICE
CERTIFICATE OF CORRECTION

PATENT NO. : 6,542,866 B1
DATED : April 1, 2003
INVENTOR(S) : Jiang et al.

It is certified that error appears in the above-identified patent and that said Letters Patent is hereby corrected as shown below:

Column 12,
Line 43, delete "input signal".
Line 56, replace "score" ($2^{nd}$ occurrence) with -- scores --.
Line 57, replace "segment" with -- segments --.
Line 58, replace "score" with -- scores --.
Line 58, after "feature" insert -- vector that is extracted using a first type of feature --.
Line 59, replace "score" with -- scores --.

Signed and Sealed this

Twenty-third Day of September, 2003

JAMES E. ROGAN
*Director of the United States Patent and Trademark Office*